July 19, 1960 N. P. BORETTI ET AL 2,945,513
METHOD OF PRODUCING SEAT FRAMES
Filed June 14, 1954 2 Sheets-Sheet 2
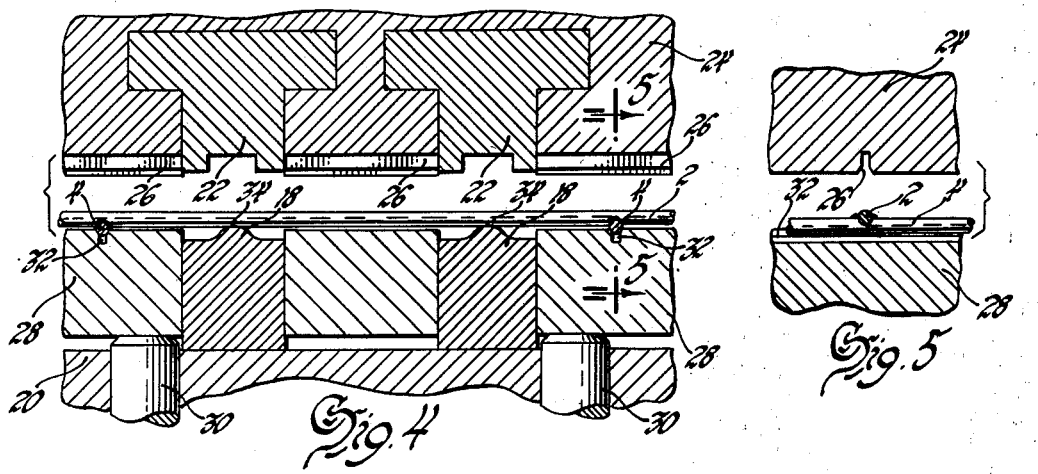
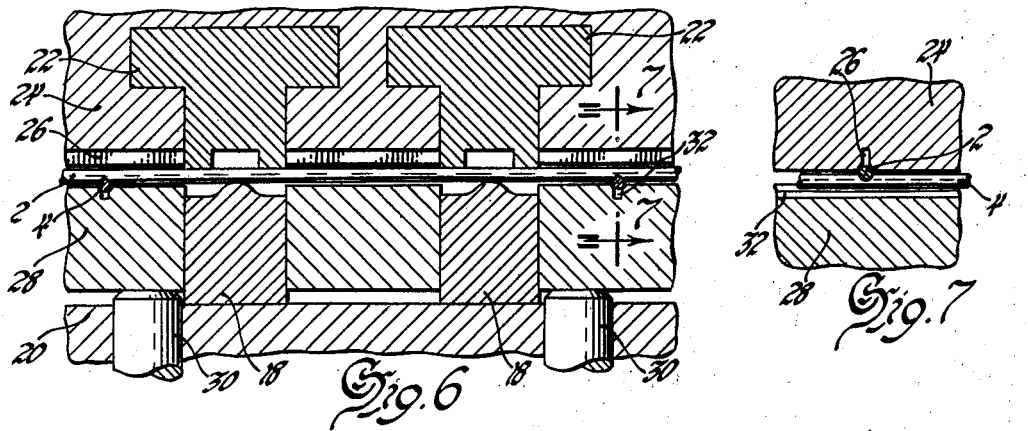
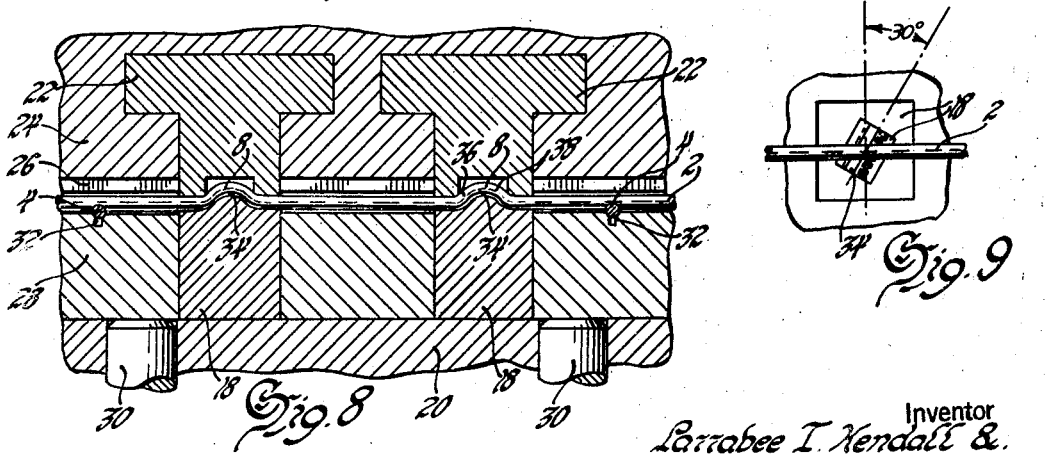
Inventor
Larrabee I. Kendall &
Napoleon P. Boretti
By Paul Fitzpatrick
Attorney United States Patent Office 2,945,513
Patented July 19, 1960

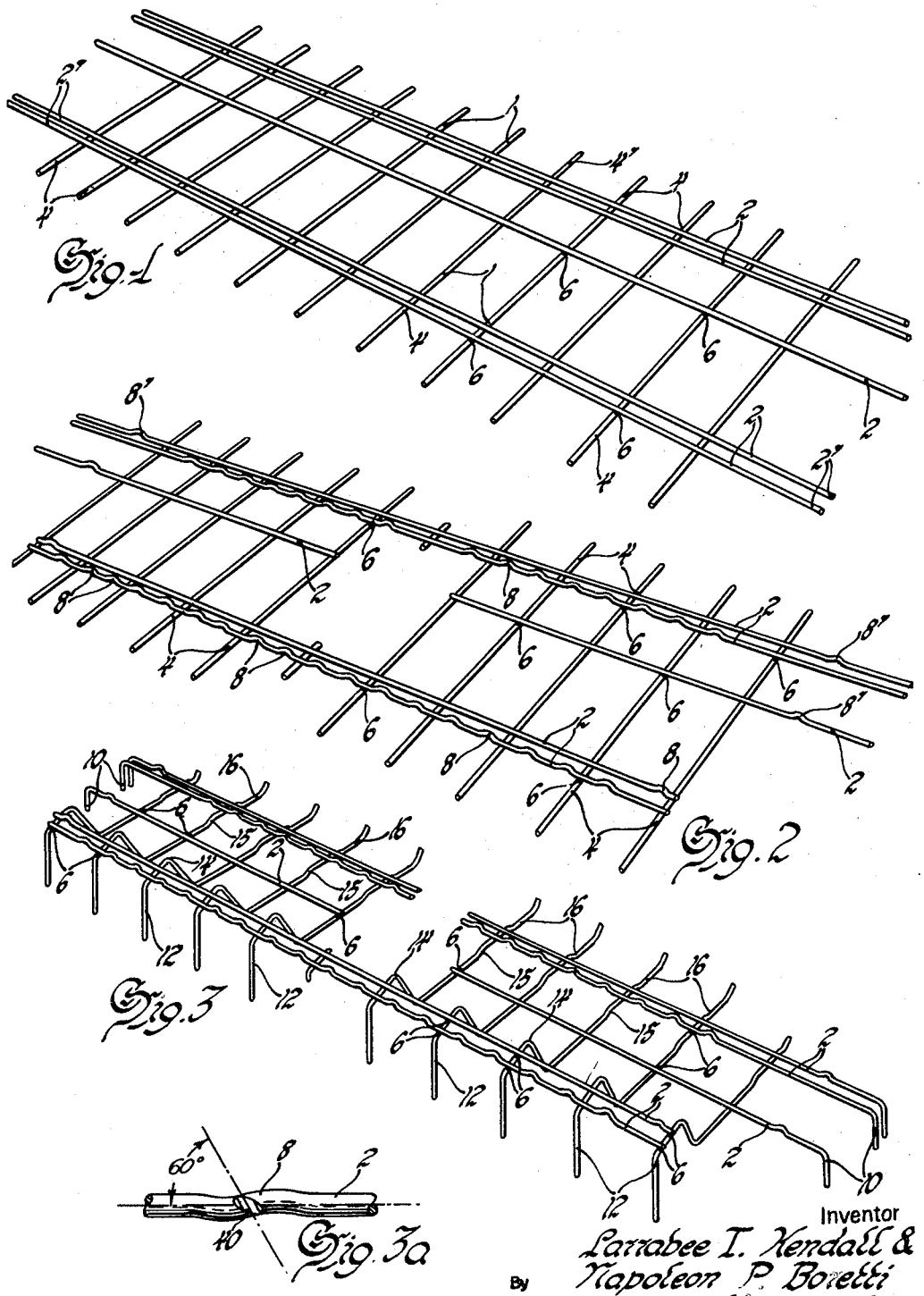

2,945,513

METHOD OF PRODUCING SEAT FRAMES

Napoleon P. Boretti, Detroit, and Larrabee T. Kendall, Huntington Woods, Mich., assignors to General Motors Corporation, Detroit, Mich., a corporation of Delaware Filed June 14, 1954, Ser. No. 436,589

4 Claims. (Cl. 140—71)

This invention relates to seat frames and more particularly to an improved method of producing wire mesh seat frames.

An object of this invention is to produce wire mesh seat frames from wire mesh blanks which are die-formed to produce the necessary contours. Prior to this invention, wire mesh seat frames having contours were produced by die-forming the individual wire members and then assembling the wire members in a welding jig where they were welded together. This was an expensive and time-consuming method of producing the seat frames. Another object of this invention is to die-form the wire members of a welded wire mesh seat blank without any longitudinal or lateral distortion of the shape of the blank. A further object of this invention is to form contours in wire members of a welded wire mesh blank by die-forming portions of the wire members between the welded intersections. Still another object of this invention is to form contours in the wire members of a welded wire mesh blank by the elongation of portions of the wire members between the welded intersections. Still a further object of this invention is to form contours in the wire members of a welded wire mesh blank by the elongation of portions of the wire members between the welded intersections while adequately supporting and holding the wire mesh blank at and adjacent to the welded intersections. Yet another object of this invention is to adequately hold and support the welded intersections of the wire members of a welded wire mesh seat blank to maintain alignment of the members and prevent breakage of the welds during the die-forming of portions of the wire members between the welded intersections.

These and other objects of this invention will be readily apparent from the following specification and drawings in which:

Fig. 1 is a view of a fabricated wire mesh blank;

Fig. 2 is a view of the blank of Fig. 1 after the first die-forming operation;

Fig. 3 is a view of the blank of Fig. 2 after the second die-forming operation;

Fig. 3a is an enlarged view of one of the contours of the wire mesh blank;

Fig. 4 is a view of the dies used in the first die-forming operation when in open position;

Fig. 5 is a cross-sectional view taken on line 5—5 of Fig. 4;

Fig. 6 is a view of the dies used in the first die-forming operation in partially closed position;

Fig. 7 is a view taken on line 7—7 of Fig. 6;

Fig. 8 is a view of the dies used in the first die-forming operation in completely closed position; and Fig. 9 is a view of one of the dies showing the relationship between the forming parts of the dies and a wire member of the wire mesh blank.

Referring now to the drawings, particularly Figs. 1, 2, and 3, a wire mesh blank 1 is produced by welding a number of longitudinal wire members 2 to a number of transverse wire members 4 as at 6. The wire mesh blank is fabricated in a suitable wire welding machine (not shown) which is well known in the art.

Figure 2 shows the wire mesh blank after the first die-forming operation. In this operation the blank is placed within a die, which will be fully described hereinafter, and contours 8 are formed in the longitudinal wire members 2. These contours are spring anchors for the ends of a suitable seat spring (not shown) such as a Z-type spring. Although the contours are shown in the longitudinal wire members 2, they may also be in the transverse wire members 4 if so desired. The majority of the contours 8 are formed intermediate the welded intersections 6 of wire members 2 and 4, although certain contours 8' may be formed beyond the welded intersections of the wire members. In the first die-forming operation certain portions of members 2 and 4 may be removed, as those shown at 2' and 4', respectively, in Fig. 1.

Figure 3 shows the blank after the second die-forming operation. In this operation certain portions of members 2 and 4 may be flanged as at 10 and 12, respectively. Other portions of members 4 may be flanged as at 14, 15, and 16 to produce a finished seat frame. The seat frame may then be mounted on a suitable foundation member (not shown) and installed in a vehicle or otherwise. The welding of the wire members and the successive die-forming operations may take place in a single machine or the welded seat blank may be transferred to other machines for the die-forming operations.

Referring to Figs. 4 through 9, the die-forming of contours 8 and 8' in wire members 2 will now be fully described. Male dies 18 are mounted on a die holder 20 and female dies 22 are mounted on a die holder 24 movable toward and away from die holder 20. Die holder 24 is provided with grooves 26 for the reception of longitudinal wire members 2 when the die holder is in closed position, shown in Figs. 6 and 8. If desired, grooves 26 may be formed in clamping blocks which can then be mounted on die holder 24. An air pad 28 is resiliently supported in spaced relationship to die holder 20 by air pad pressure pins 30. The air pad has grooves 32 for the reception of transverse wire members 4. The portions of the air pad between and beyond dies 18 cooperate with the portions of grooves 26 between and beyond dies 22 to securely support and hold wire members 2 in the closed position of the dies shown in Figs. 6 and 8.

Figs. 4, 6, and 8 show various steps in the first die-forming operation and these steps will now be described. In Fig. 4 the wire mesh blank has been placed between die holder 24 and air pad 28 and transverse wire members 4 have been fitted within grooves 32. Wire members 2 rest on male dies 18 at 34. In Fig. 6 the dies are partially closed to clamp or hold the wire mesh blank in place preparatory to die-forming certain portions of wire members 2. In this position of the dies, wire members 2 are received in grooves 26 of die holder 24. Wire members 4 are securely held at their welded intersections with wire members 2 and along their entire length by grooves 32 and die holder 24. Wire members 2 are securely held between dies 18 and dies 22 and beyond these dies by grooves 26 of die holder 24 and air pad 28. The only portions of wire members 2 which are not securely held are those portions within dies 18 and 22.

A partial closing step of the dies before the die-forming of wire members 2 insures that there will be no tension on the welded intersections of the wire members during the die-forming operation which is sufficiently great to cause the welds to break. The contours 8 and 8' are simultaneously formed in wire members 2. At certain of the welded intersections of wire members 2 and 4, contours 8 are formed on either side of the welded intersection. Thus, the tension on the welded intersection from one side will be substantially balanced by the tension on the welded intersection from the other side and the tension on the welds will be negligible. In the formation of other contours 8 and contours 8', the tension on the welded intersection will be from one side only. However, since wire members 2 are securely held from the lips of the dies to the welded intersections, the tension will gradually diminish from contours 8 or 8' to the welded intersections and the tension on the welded intersections will again be minor.

In Fig. 8 the dies are shown in completely closed position to form contours 8 and 8'. As the dies are closed, air pad member 28 moves downwardly against the action of pressure pins 30 and comes to rest on die holder 20. Heavy gauge wire is used for the wire members of the mesh blank, No. 6 gauge wire being suitable, and considerable pressure is required in order to form contours in wire of this size. Each portion of the wire member 2 adjacent the portion within the dies 18 and 22 must be adequately supported and held if it is not to be distorted or buckled in a horizontal plane by the formation of the contours. This is done by holding such portions of the wire between die holder 24 having grooves 26 and air pad 28. Thus, there will be no distortion or buckling in a horizontal plane during formation of the contours. This has always been a serious problem in die-forming operations.

Another serious problem which arises in die-forming operations is the lateral or longitudinal distortion of the shape of the wire mesh blank by the formation of the contours. Various methods of die-forming have been used to prevent this distortion but none are completely successful. Some methods operate on the principle that a uniform shortening of each wire member being die-formed will prevent any lateral or longitudinal distortion of the shape of the blank. This result is not always achieved. However, the original dimensions of the blank are still changed which results in a waste of material when the longitudinal or transverse members are finally cut to size. Other methods holds the longitudinal or transverse wire members by making the width of one of the dies equal to the longitudinal or transverse spacing of the wire members. This may result in breakage of the welds inasmuch as the elongation of the portion of the wire being die-formed pulls the weld against the sides of the die.

In this invention, the elongation of the wire member to form the contour takes place only at 36 and 38. This is achieved by holding the wire members at and adjacent to their welded intersections to prevent any lateral or longitudinal distortion in the shape of the blank and to prevent any distortion or buckling in a horizontal plane of the the wire members being die-formed. Thus, elongation takes place only within dies 18 and 22 at 36 and 38.

Referring to Fig. 9, the forming parts of the male dies 18 and female dies 22 are placed at an angle of 30° with respect to a line normal to the longitudinal axis of wire member 2. Referring now to Figure 3a, the grooves 40 in the contours 8 are then formed at an angle of 60° to the longitudinal axis of the wire members 2. The end of the Z-spring passes through and underneath the contour approximately at an angle of 60° to the longitudinal axis of wire member 2 and by forming the contours to conform to this angle, their depth is reduced to a minimum. Inasmuch as heavy gauge wire is used for the wire members, the force required to form the contours is reduced by making the depth the least possible. This results in less wear of the dies and less elongation of the wire member being die-formed.

While a specific embodiment of this invention has been shown and described, various changes may be made within the scope and spirit of the invention without departing from it.

We claim:
1. A method of producing wire seat frames comprising, fabricating a wire mesh blank by welding longitudinal and transverse wire members together at the intersections thereof, rigidly holding said wire members together at at least one pair of successive welded intersections thereof to maintain the fabricated spatial relationship of said successive welded intersections and prevent breaking of the welds thereof, and die forming a portion of one of said wire members intermediate said successive welded intersections being held to form contours in said one of said wire members solely by the elongation of said portion being die formed, whereby the fabricated spatial relationship of said successive welded intersections remains constant.

2. A method of producing wire seat frames comprising, fabricating a wire mesh blank by welding longitudinal and transverse wire members together at the intersections thereof, rigidly holding one of said wire members at spaced portions thereof intermediate and adjacent a pair of successive welded intersections thereof to maintain the fabricated spatial relationship of said successive welded intersections and prevent breaking of the welds thereof, and die forming a portion of said one of said wire members intermediate said spaced portions being held and between said successive welded intersections to form contours in said one of said wire members solely by the elongation of said portion being die formed, whereby the fabricated spatial relationship of said successive welded intersections remains constant.

3. A method of producing wire seat frames comprising, fabricating a wire mesh blank by welding longitudinal and transverse wire members together at the intersections thereof, rigidly holding said wire members together at at least one pair of successive welded intersections thereof and holding one of said wire members at spaced portions thereof intermediate said pair of welded intersections being held to maintain the fabricated spatial relationship of said successive intersections and prevent breaking of the welds thereof, and die forming a portion of said one of said wire members intermediate said portions thereof being held and between said successive welded intersections to form contours in said one of said wire members solely by the elongation of said portion being die formed, whereby the fabricated spatial relationship of said pair of successive welded intersections remains constant and there is no breaking of the welds at said intersections.

4. A method of producing wire seat frames comprising, fabricating a wire mesh blank by welding longtiudinal and transverse wire members together at the intersections thereof, rigidly holding said wire members together at a number of successive welded intersections thereof and holding one of said wire members at spaced portions thereof adjacent and on opposite sides of each of said successive welded intersections to maintain the fabricated spatial relationship of said successive welded intersections and prevent breaking of the welds thereof, and die forming a portion of said one of said wire members intermediate said spaced portions being held and on opposite sides of each of said successive welded intersections being held to form contours in said one of said wire members solely by the elongation of said portions being die formed, whereby the tension on said welded intersection is substantially equal from each side during said die forming and the fabricated spatial relationship of said successive welded intersections remains constant.

References Cited in the file of this patent
UNITED STATES PATENTS

| | | |
|---|---|---|
| 346,479 | Johnson | Aug. 3, 1886 |
| 687,753 | Hoefer | Dec. 3, 1901 |
| 1,375,305 | Maisel | Apr. 19, 1921 |
| 2,079,553 | Fraser | May 4, 1937 |
| 2,116,780 | Chartener | May 10, 1938 |
| 2,175,066 | Riley | Oct. 1, 1939 |
| 2,218,749 | Heilman | Oct. 22, 1940 |
| 2,302,953 | Pocock | Nov. 24, 1942 |
| 2,646,277 | Southwick | July 21, 1953 |
| 2,700,991 | Stockton | Feb. 1, 1955 |